United States Patent

Rao et al.

Patent Number: 5,854,710
Date of Patent: Dec. 29, 1998

[54] OPTICAL FOURIER PROCESSING

[75] Inventors: Devulapalli V. G. L. N. Rao, Lexington; Francisco J. Aranda, Arlington, both of Mass.; Joby Joseph, New Delhi, India; Joseph A. Akkara, Holliston; Masato Nakashima, Weston, both of Mass.

[73] Assignee: University of Massachusetts, Boston, Mass.

[21] Appl. No.: 709,994

[22] Filed: Sep. 9, 1996

[51] Int. Cl.[6] .............................. G02B 27/46; G02B 5/30; G03C 11/00; G11C 13/04
[52] U.S. Cl. ........................... 359/559; 359/489; 430/19; 430/21; 365/121
[58] Field of Search ................................ 359/3, 29, 559, 359/489; 369/110; 356/318; 365/117, 121; 382/210; 430/19, 21

[56] References Cited

U.S. PATENT DOCUMENTS

| | | | |
|---|---|---|---|
| 4,471,470 | 9/1984 | Swainson et al. | 365/127 |
| 5,072,314 | 12/1991 | Chang | 359/559 |
| 5,228,001 | 7/1993 | Birge et al. | 365/215 |
| 5,253,198 | 10/1993 | Birge et al. | 365/106 |
| 5,290,699 | 3/1994 | Oesterhelt et al. | 435/252.3 |
| 5,346,789 | 9/1994 | Lewis et al. | 430/19 |

OTHER PUBLICATIONS

Aranda et al., "Nonlinear Optical Interactions in Bacteriorhodopsin Using Z–Scan," *Optical Review,* 2:(3)204–206, 1995 no month.

Aranda et al., "All–optical light modulation in bacteriorhodopsin in films," *Appl. Phys. Lett.,* 67:(5)599–601, 1995 no month.

Birge et al., "Nonlinear Optical Properties of Bacteriorhodopsin: Assignment of the Third–order Polarizability Based on Two–Photon Absorption Spectroscopy," *SPIE Biomolecular Spectroscopy II,* 1432:129–140, 1991 no month.

Birge, "Protein–Based Optical Computing and Memories," *Computer,* 1100:56–67, Nov. 1992.

Birge, "Protein–Based Computers," *Scientific American,* pp. 90–95, Mar. 1995.

Burykin et al., "Photoinduced anisotropy in Bio–Chrom films," *Optics Communications,* 54:(2) 68–70, 1985 no month.

Chang et al., "Spatial amplification: an image–processing technique using the selective amplification of spatial frequencies," *Optical Letters,* 15:(13)743–745, 1990 no month.

Chen et al., "Bacteriorhodopsin oriented in polyvinyl alcohol films as an erasable optical storage medium," *Applied Optics,* 30:(55)5188–5196, 1991 no month.

Dovgalenko et al., "Optically induced birefringence in bacteriorhodopsin as an optical limiter," *Appl. Phys. Lett.,* 68:(3)287–289, 1996 no month.

Downie, "Nonlinear coherent optical image processing using logarithmic transmittance of bacteriorhodopsin films," *Applied Optics,* 34:(23)5210–5217, 1995 no month.

Downie, "Real–time holographic image correction using baterиorhodopsin," *Applied Optics,* 33:(20)4353–4357, 1994 no month.

(List continued on next page.)

*Primary Examiner*—Paul M. Dzierzynsky
*Assistant Examiner*—Andrey Chang
*Attorney, Agent, or Firm*—Fish & Richardson P.C.

[57] ABSTRACT

The invention relates to systems and methods for optical Fourier processing and logic operations based on the discovery that the photoinduced anisotropy of photochromic materials such as bacteriorhodopsin, organic fulgides, azo and fluorescent dyes, phycobiliproteins, rhodopsins, and their analogs, is dependent on the intensity of a polarized actinic beam that illuminates the material and the intensity profile of one or more input beams. This intensity dependence can be used to implement a simple, real-time, self-adaptive optical processing, i.e., spatial filtering, system for Fourier processing of optical input images. This optical processing system can be used to process a wide variety of optical input images, from projected still images to live motion picture images.

38 Claims, 9 Drawing Sheets

OTHER PUBLICATIONS

Glückstad et al., "Spontaneous pattern formation in a thin film of bacteriorhodopsin with mixed absorptive–dispersive nonlinearity," *Optic Letters,* 20:(6)551–553, 1995 no month.

Hampp et al., "Mutated Bacteriorhodopsins: Competitive Materials for Optical Information Processing?", *MRS Bulletin,* 17:(11)56–60, 1992 no month.

Haronian et al., "Microfabricating bacteriorhodopsin films for imaging and computing," *Appl. Phys. Lett.,* 61:(18)2237–2239, 1992 no month.

Hendrickx et al., "The Bacteriorhodopsin Chromophore Retinal and Derivatives: An Experimental and Theoretical Investigation of the Second–Order Optical Properties," *J. Am. Chem. Soc.,* 117:3547–3555, 1995 no month.

Hong, "The Bacteriorhodopsin Model Membrane System as a Prototype Molecular Computing Element," *BioSystems,* 19:223–236, 1986 no month.

Huignard et al., "Real–time coherent object edge reconstruction with $Bi_{12}SiO_{20}$ crystals," *Applied Optics,* 17:(17)2671–2672, 1986 no month.

Imam et al., "Photoanisotropic incoherent–to–coherent using a bacteriorhodopsin thin film," *Optics Letters,* 20:(2)225–227, 1995 no month.

Kirkby et al., "Optical Nonlinearity and Resonant Bistability in Organic Photochromic Thin Films," *Optical Bistability III,* Proceedings of the Topical Meeting, Tucson, AZ, Springer–Verlag, 1985 no month.

Korchemskaya et al., "Spatial polarization wavefront reversal under conditions of four–wave mixing in biochrome films," *Sov. J. Quantum Electron.,* 17:(4) 450–454, 1987 no month.

Korchemskaya et al., "Photoinduced anisotropy, four–wave mixing and phase conjugation in materials based on bacteriorhodopsin," *SPIE High–Speed Phenomena in Photonic Materials and Optical Bistability,* 1280:308–313, 1990 no month.

Nesset et al., "All–optical AND gate operating on 10Gbit/s signals at the same wavelenght using four–wave mixing in a semiconductor laser amplifier," *Electronics Letters,* 31:(11)896–897, 1995 no month.

Oesterhelt et al., "Bacteriorhodopsin: a biological material for information processing," *Quart. Review of Biophysics,* 24:(4)425–478, 1991 no month.

Rao et al., "Mirrorless all–optical bistability in bacteriorhodopsin," *Appl. Phys. Lett.* 63:(11)1489–1491, 1993 no month.

Rao et al., "All–optical logic gates with bacteriorhodopsin films," *Optics Communications* 127:193–199, 1996 no month.

Song et al., "Optical limiting by chemically enhanced bacteriorhodopsin films," *Optics Letters,* 18:(10) 775–777, 1993 no month.

Takei et al., "Spatial light modulation based on photoinduced change in the complex refractive index of bacteriorhodopsin," *Applied Optics,* 35:(11)1848–1854, 1996 no month.

Taranenko et al., "Optical bistability and signed competition in active cavity with photochromic non–linearity of bacteriorhodopsin," *SPIE Optical Memory and Neural Networks,* 1621:169–179, 1991 no month.

Thoma et al., "Bacteriorhodopsin films as spatial light modulators for nonlinear–optical filtering," *Optics Letters,* 16:(9)651–653, 1991 no month.

Thoma et al., "Real–time holographic correlation of two video signals by using bacteriorhodopsin films," *Optics Letters,* 17:(16)1158–1160, 1992 no month.

Vsevolodov et al., "Actual Possibilities of Bacteriorhodopsin Application in Optoelectronics," Institute of Biological Physics, USSR Academy of Sciences, pp, 381–384 no date.

Werner et al., "Saturable absorption, wave mixing, and phase conjugation with bacteriorhodopsin," *Optics Letters,* 15:(20)1117–1119, 1990 no month.

Werner et al., "Strong self–defocusing effect and four–wave mixing in bacteriorhodopsin films," *Optics Letters,* 17:(4)241–243, 1992 no month.

| $\bar{A}\bar{B}\bar{C}$ | $\bar{A}B\bar{C}$ | $AB\bar{C}$ | $A\bar{B}\bar{C}$ |
|---|---|---|---|
| $\bar{A}\bar{B}C$ | $\bar{A}BC$ | $ABC$ | $A\bar{B}C$ |

OPTICAL FOURIER PROCESSING

This invention was made with Government support under BAA Contract No. DAAK 60-92-K-002. The government may have certain rights in this invention.

BACKGROUND

This invention relates to optical Fourier processing and optical processing systems using photochromic materials such as rhodopsin, e.g., bacteriorhodopsin and bacteriorhodopsin analogs.

Photochromic materials are capable of changing color upon exposure to radiant energy such as light. One such material is rhodopsin, or "visual purple," a photosensitive, red protein pigment in the retinal rods of marine fishes and most higher vertebrates, e.g., octopus, mollusks, and man. A protein related both in structure and function to rhodopsin is the halobacterial retinal-containing protein bacteriorhodopsin (bR), which is a light-absorbing protein synthesized by the bacteria *Halobacterium halobium*. The chromophore is a retinal moiety linked via a protonated Schiff base near the middle of helix G to lysine-216.

In its natural state the bR molecules perform the biological function in the halobacterial cell of converting light into an electrochemical ion gradient across the membrane, i.e., it pumps cytoplasmic protons across the membrane to the outside of the cell, to synthesize ATP from inorganic phosphate and ADP. When irradiated, individual bR molecules undergo light-induced structural changes that result in large changes in optical properties as the molecule passes through different states in a so-called "photocycle."

In the initial B state of bR, also called the "light adapted" state, the retinal chromophore is in an all-trans molecular configuration. The B state has an absorption maximum at 570 nm, with a broad absorption band of ±100 nm, that allows bR to be excited by means of light in the red, yellow, or green portions of the optical spectrum. Once a photon is absorbed, the retinal chromophore undergoes configurational and conformational changes, the first of which is in a sub-picosecond time frame. The chromophore subsequently goes through a series of short-lived intermediates to the so-called M state, which has an absorption maximum at 410 nm wavelength.

The M state can revert to the initial B state via thermal relaxation processes or by photochemical processes upon excitation with blue light (410±50 nm). The thermal relaxation of the chromophore from the M state is initiated by the reprotonation of the aspartic acid in position 96 (Asp-96 residue). The retinal molecule is then able to isomerize once again and relax to the all-trans B state. The lifetime of the M state depends on the kinetics of the reprotonation process, and can be altered by different means such as controlling the extent of drying, controlling pH, changing the temperature, and by modifying the molecular structure by genetic mutation. For example, Chen et al. (Appl. Opt., 30, 5188, 1991) describes high pH bR films in which the M state lifetime is increased from milliseconds to tens of seconds. The time required to switch between the M and B states via a photochemical process is much faster than the states' lifetime, and is typically on the order of nanoseconds. Because of the short lifetimes of the other intermediate states, the bR photocycle can be approximated by a two-state model that includes only the B and M states.

Of the rhodopsins, bR is the most chemically and environmentally robust (it can be stored for years without degrading) and, unlike many biological materials, bR is not adversely affected by environmental perturbations such as heat, light, and humidity. In fact, bR is stable at temperatures of up to about 140° C., is stable with respect to photodegradation, and can be exposed to light for long periods of time without sacrificing optical performance. For example, no noticeable change is observed after a bR film is switched between the B and M states more than a million times with a quartz lamp with appropriate color filters.

In addition to its stability, bR has many desirable optical properties. Bacteriorhodopsin has a high optical absorption cross-section for both B and M states and attains optical saturation at very low intensities. Bacteriorhodopsin additionally has a fast switching time, and can switch between M and B states in a matter of nanoseconds. Due to its optical properties, bR has been proposed as a material with applications in photonics technology, e.g., in information processing (Chen et al., Applied optics, 30, 5188 (1991); Hampp et al., Physics Today, 41, 38 (1988); Korchemskaya et al., Sov. Journal of Quantum Electronics, 17, 450 (1987)), and in computer memories (Birge et al., Scientific American, p. 90 (March, 1995)).

The use of bR in optical image processing is based on the fact that bR's absorption of light triggers a photochemical cycle in the bR molecule. In its initial state, the bR film is isotropic with a random but rigid orientation of bR molecules. Illumination of a bR film at a wavelength of about 570 nm (B to M state transition) reduces the absorption coefficient of the film at that wavelength, and bleaches these molecules. Upon illumination of the film with a linearly polarized light (a so-called "actinic beam"), the film shows anisotropic properties of photoinduced dichroism and photoinduced birefringence (Burykin et al., Opt. Commun., 54, 68, 1985). The magnitude and sign of the induced anisotropy are dependent on the actinic light intensity and wavelength. Since the actinic beam is linearly polarized and the bR molecules in the film are randomly oriented but rigidly maintained, only those bR molecules that have their transition dipole moments oriented for absorption in or near the electric field direction of the light are bleached. Turning off the actinic beam returns the film to its initial isotropic state with a relaxation time equal to the lifetime of the intermediate M state.

Optical Fourier processing is a powerful tool in optical computing and processing systems. Conventional optical Fourier processing ("spatial filtering") systems include a series of lenses that process an optical input by relative masking or matching of the Fourier domain frequencies at the common Fourier plane of the lenses. However, such conventional spatial filtering systems cannot operate in real time, because a precise alignment is needed to mask some spatial frequencies, and the masks must be prepared in accordance with the optical input information.

Nonlinear optical materials have been used to implement Fourier transform operations, such as edge enhancement, band pass filtering, noise removal, and pattern recognition, of optical inputs. See for example, Oesterhelt et al., Quarterly Rev. Biophysics, 24:425–478 (1991). The parallel processing nature of optics and the real-time characteristics of many nonlinear optical materials contribute to the importance of optical Fourier processing using nonlinear materials.

For example, Thoma et al., Opt. Lett., 16, 425 (1991), describes an optical spatial filter in which a control beam manipulates the spatial frequencies of an optical input at a Fourier plane. Imam et al., Opt. Lett., 20, 225 (1995), describes an incoherent-to-coherent converter using the photoinduced anisotropic properties of bR thin films. In addition, Downie, Appl. Opt., 34, 5210 (1995), describes the use of the logarithmic transmission characteristics of bR films to implement optical image processing. Recently, Takei and Shimizu, Appl. Opt., 35, 1848 (1996), used the photoinduced refractive index change of bacteriorhodopsin for spatial light modulation.

SUMMARY

The invention is based on the discovery that the photoinduced anisotropy of photochromic materials such as bacteriorhodopsin is dependent on the intensity of a polarized actinic beam that illuminates the material, and that this intensity dependence can be used to implement a simple, real-time, self-adaptive optical processing system for Fourier processing of optical input images. This optical processing system can be used to process a wide variety of optical input images, from projected still images to live motion picture images.

In one aspect, the invention features an optical processing system. The system includes a film including a photochromic material, a first radiation source to generate an input beam, a polarizer arranged in the path of the input beam to generate a polarized input beam, a first optical Fourier transformer, e.g., a lens or mirror, arranged to focus the polarized input beam onto the photochromic material film, a second radiation source to generate a polarized actinic beam configured to illuminate the photochromic material film such that the film transmits a variably polarized image beam including a plurality of polarization components, a second optical Fourier transformer arranged to provide an inverse Fourier transform of the variably polarized image beam from the photochromic material film, a polarizing analyzer arranged in the path of the variably polarized image beam to generate an output image beam, and a radiation detector arranged to detect the output image beam. The input beam carries an input image. The actinic beam is set at a wavelength and intensity to induce in the photochromic material anisotropy that varies as a function of the intensity of total illumination on the photochromic material. The polarizing analyzer is configured to selectively block a specific set of polarization components to generate the output image beam.

In another aspect, the invention features an optical processing system including a film of photochromic material, a first radiation source to generate a polarized input beam which is projected onto the film, a second radiation source to generate a first polarized actinic beam configured to illuminate the photochromic material film, a third radiation source to generate a second polarized actinic beam configured to illuminate the photochromic material film such that the film transmits a variably polarized image beam including a plurality of polarization components, a polarizing analyzer arranged in the path of the variably polarized image beam and configured to selectively block a specific set of polarization components to generate an output image beam, and a radiation detector arranged to detect the output image beam. The first and second actinic beams are independently set at wavelengths and intensities to induce in the photochromic material anisotropy that varies as a function of the intensity of total illumination on the photochromic material. In different embodiments, the input beam carries a first input image and the first actinic beam carries a second input image, or the first actinic beam carries a first image and the second actinic beam carries a second image. In another embodiment, the input beam carries a first input image, the first actinic beam carries a second input image, and the second actinic beam carries a third image.

In another aspect, the invention features a method of spatial filtering of optical image data. First, the method includes irradiating a film including a photochromic material with an input beam. The input beam carries an input image. The method also includes polarizing the input beam to generate a polarized input beam. Next, the method includes focusing the polarized input beam onto the photochromic film by Fourier transformation and illuminating the photochromic material film with a polarized actinic beam such that the film transmits a variably polarized image beam including a plurality of polarization components. Then, the method includes retrieving the variably polarized image beam from the photochromic material film by an inverse Fourier transform and generating an output image beam by arranging a polarizing analyzer in the path of the variably polarized image beam to selectively block a specific set of polarization components. Finally, the method includes detecting the output image with a radiation detector. The actinic beam is set at a wavelength and intensity to induce in the photochromic material anisotropy that varies as a function of the intensity of total illumination on the photochromic material.

In another aspect, the invention features a method of performing wavelet filtering of optical image data. First, the method includes irradiating a film including a photochromic material with an input beam. The input beam carries an input image. The method also includes polarizing the input beam to generate a polarized input beam. Next, the method includes focusing the polarized input beam onto the photochromic film by Fourier transformation, illuminating the photochromic material film with a polarized actinic beam such that the film transmits a variably polarized image beam including a plurality of polarization components, and illuminating the photochromic material film with a third beam which is shaped to transmit a particular set of polarization components through the analyzer. Then, the method includes retrieving the variably polarized image beam from the photochromic material film by an inverse Fourier transform and generating an output image beam by arranging a polarizing analyzer in the path of the variably polarized image beam to selectively block a specific set of polarization components. Finally, the method includes detecting the output image with a radiation detector. The actinic beam is set at a wavelength and intensity to induce in the photochromic material anisotropy that varies as a function of the intensity of total illumination on the photochromic material.

In another aspect, the invention features a method of performing logic manipulations of optical input data. The method includes the steps of: irradiating a film including a photochromic material with a polarized input beam; illuminating the photochromic material film with a first polarized actinic beam configured to illuminate the photochromic material film; illuminating the photochromic material film with a second polarized actinic beam configured to illuminate the photochromic material film such that the film transmits a variably polarized image beam including a plurality of polarization components; generating an output image beam by arranging a polarizing analyzer in the path of the variably polarized image beam to selectively block a specific set of polarization components; and detecting the output image with a radiation detector. The first and second actinic beams are independently set at wavelengths and intensities to induce in the photochromic material anisotropy that varies as a function of the intensity of total illumination on the photochromic material.

In preferred embodiments, the first and second optical Fourier transformers are lenses. In other embodiments, the input beam or the actinic beam varies in real time.

Preferably, the photochromic material is an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, or an analog of any of the materials. Most preferably, the photochromic material is bacteriorhodopsin or a bacteriorhodopsin analog.

When the photochromic material is bacteriorhodopsin or an analog, the actinic beam is set at a wavelength of about 570 nm±100 nm, and the input beam is set at a wavelength of 300 to 800 nm. The input beam and the actinic beam can be generated by a laser or by an incoherent white light source. The actinic beam can be set at an intensity of between 0.01 and 100 mW/cm$^2$, more preferably between 2 and 18 mW/cm$^2$. The input beam can be set at an intensity of between 0.0001 and 10 mW/cm$^2$, more preferably between 0.01 and 1 mW/cm$^2$. In certain embodiments, the actinic beam is shaped to transmit a particular set of polarization components through the analyzer. In other embodiments, the actinic beam is set at an intensity to induce maximum anisotropy in the photochromic material.

The input beam can include a fixed image or a moving image, and can be generated by a medical imaging technique, e.g., by an X-ray, magnetic resonance, computerized axial tomography, or ultrasound imaging technique. In another embodiment, the input image is generated by a satellite camera.

In certain embodiments, the analyzer is configured to selectively block high intensity, low frequency components of the input image. In other embodiments, the analyzer is configured to selectively block low intensity, high frequency components of the input image. Preferably, the system provides edge enhancement of the input image or noise filtering of the input image.

In another embodiment, the system further includes a third radiation source to generate a third beam. The third beam illuminates the photochromic material film. In preferred embodiments, the third beam is shaped to transmit a particular set of polarization components through the analyzer. The third beam can be set at a wavelength of between 300 and 800 nm, more preferably between 360 and 460 nm.

As used herein, a "photochromic material" is any optically sensitive material that exhibits the property of photoinduced anisotropy that depends on the intensity of the optical radiation illuminating the material.

As used herein, an "analog" of a photochromic material is a variant of a naturally occurring photochromic material, but maintains the property of intensity-dependent, photoinduced anisotropy. Thus, a "bacteriorhodopsin analog" is any form of bR that is different from the naturally occurring, wild-type form, but that still exhibits the property of intensity-dependent, photoinduced anisotropy. The bR or bR analog can be contained in a variety matrix environments. Examples of bR analogs include mutant forms in which one or more amino acids are altered or exchanged, e.g., by genetic engineering techniques, and chemically altered forms, in which the bR chromophore retinal is replaced with an altered or different chromophore, e.g., an azulene derivative of retinal.

An "optical Fourier transformer" is any device, e.g., a lens or mirror, that can Fourier transform and focus an optical image.

Unless otherwise defined, all technical and scientific terms used herein have the same meaning as those commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated herein by reference in their entirety. In case of conflict, the present application, including definitions, will control. In addition, the materials, methods, and examples are illustrative only and not intended to be limiting.

The optical processing system provides a number of advantages. An important advantage of this optical system is that it is simple to manufacture and easy to use in real time operation, because there is no need to precisely align the lenses at the Fourier plane, no need for special masks, no need for vibration isolation, and no need for a coherent light source. This is in contrast to conventional spatial filtering devices that selectively mask Fourier frequencies and cannot be used in real time because of the precise alignment needed to mask certain spatial frequencies, and the need for masks prepared in advance in accordance with the optical input.

In addition, the present optical processing system does not require a precise alignment of the actinic beam or the optical input image or images at the Fourier plane, whereas many of the real time Fourier processing devices that use photorefractive crystals and other nonlinear materials require precise alignment of their input beams, one or more of which carry images.

Finally the cost of producing the optical processing systems is low, they have very low power requirements, and they are environmentally friendly to manufacture. These and other advantages will be apparent from the following detailed description, and from the claims.

BRIEF DESCRIPTION OF THE DRAWINGS

FIG. 5B shows the high intensity central portion of the beam blocked to form a donut-shaped processed output image. Further processing through rotation of an analyzer gives the output image of FIG. 5C, which shows a large blocked ring of equal intensity within the beam. FIG. 5D shows a thin ring of the beam blocked by the processing system after further rotation of the analyzer. FIG. 5E shows the outer edge of the beam blocked to form a beam image with a smaller diameter.

DETAILED DESCRIPTION

Figure 1:
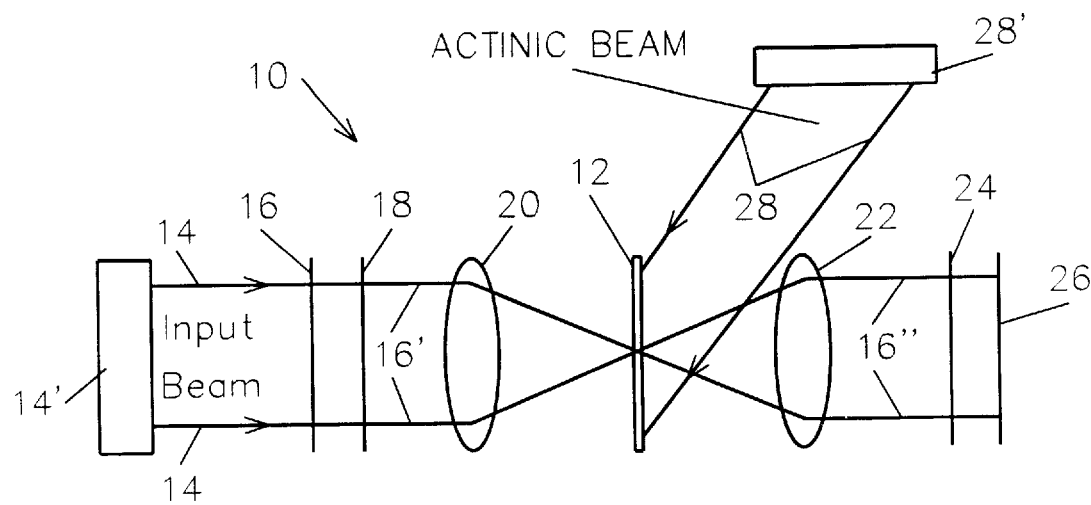
FIG. 1 is a schematic drawing of an optical Fourier processing system using a bacteriorhodopsin film as the photochromic material, and including two lenses, a polarizing filter, and a polarizing analyzer.

The invention is based on the discovery that photochromic materials such as bacteriorhodopsin or organic photochromic fulgides can be used under specific conditions to operate in a simple, real-time, self-adaptive optical Fourier processing system to perform functions such as edge enhancement, low-, band-, and high-pass filtering, notch filtering, noise filtering, flow visualization, wavelet-like filtering, and beam shaping.

The processing system effectively utilizes the dependence of photoinduced dichroism in the photochromic material on input beam and actinic beam intensity to imprint continuous polarization variations on the different spatial frequency components of an input image. Spatial filtering of desired frequencies is then performed by a polarizing analyzer. This simple new processing system requires no alignment at the Fourier plane to perform the processing, and since no interference recordings are involved, vibration isolation systems are also not required. In addition, the system can use any polarized light source for the input beam, coherent or not, such as a white light source. The actinic beam can also be coherent or non-coherent such as a white light with an appropriate wavelength filter to induce photoanisotropy in the photochromic material film.

All of the optical processing systems have certain materials and elements in common. First, each system contains a photochromic material, e.g., in the form of a film, which exhibits the property of a photoinduced anisotropy that depends on the intensity of the optical radiation illuminating the material. In addition, each system includes at least two Fourier transforming lenses, one on each side of the photochromic material film (see FIG. 1), such as any converging lens (e.g., lens available from CVI of New Mexico), a polarizing filter between the input image and the first lens, and a polarizing analyzer between the second lens and the output image plane. The analyzer can be a Glan-Thompson polarizer, available from Melles-Griot of California.

Photochromic Materials

Photochromic materials that can be used in the processing system include organic photochromic fulgides, cytochrome C, azo dyes such as naphthol red and yellow, carbazole compounds with a conjugated side chain and/or electron withdrawing groups, phycobiliproteins such as phycocyanins and phycoerythrins, fluorescent dyes such as erythrosin and fluorescein, the rhodopsins, bacteriorhodopsin, and their respective analogs.

Fulgides, as described in Kirkby et al., "Optical Nonlinearity and Resonant Bistability in Organic Photochromic Thin Films," p. 165 in *Optical Bistability III*, Gibbs et al. (eds.), Proceedings (Tucson, Ariz., Dec. 2–4, 1985, Springer, New York, 1985), include E-a-2,5dimethyl-3-furyl ethylidene (isopropylidene) succinic anhydride, which has been shown to have a bleached state under UV (300–375 nm) illumination, and a colored state under green light (514±50 nm) illumination. Thus, this fulgide should be useful in the all-optical devices described herein.

Phycobiliproteins are deeply colored, highly fluorescent photoreceptor pigments found in blue-green, red, and cryptomonad algae. These pigments are classified according to their absorption maxima, with phycocyanins having an absorption maximum in the blue wavelengths, phycoerythrins having an absorption maximum in the red wavelengths, and allophycocyanins which have an absorption maximum in the pale blue wavelengths. Phytochrome is a similar biliprotein found in plants, and exists in two forms that are interconverted upon alternate exposure to red and far-red light.

Rhodopsins, as found in most vertebrates, can be used in the optical processing systems, but are generally not preferred because they are difficult to stabilize for long periods of time. For example, human, octopus, mollusk, and insect rhodopsin, and analogs thereof, should be useful in the present invention.

On the other hand, a related molecule, bacteriorhodopsin (bR), is a preferred photochromic material for use in the optical processing systems, because of its high stability. Different forms, or analogs, of bR can be used in the processing systems to achieve different results. Bacteriorhodopsin can be modified to tailor its optical properties, e.g., absorption bands and kinetic properties, for specific applications. These properties can be adjusted in a controlled manner, meaning that analogs of bR can be tailored to operate in combination with a wide range of light sources, such as lasers, e.g., diode or UV/vis lasers, or white light sources.

For example, the lifetime of the M state can be increased to lower the saturation intensity level of a particular bR-containing material at 410±50 nm. This, in turn, can significantly lower the power requirements of devices manufactured using this material. For example, the M state lifetime can be increased by adjusting the pH to about 8 to 10 during manufacture of a thin polymer film containing bR. When the pH is increased in this manner, the saturation intensity level of the M state decreases.

The lifetime also can be altered by adding chemicals such as polyvalent metal ions, guanidine hydrochloride, diaminopropane, or ethylene diamine, to a polymer matrix including bR, or by creating mutant forms of the bR protein through genetic engineering. For example, the aspartic acid residue at position 96 in the bR protein can be replaced by an asparagine residue to increase the M state lifetime from 10 to 750 milliseconds. See, e.g., Birge, Computer, 56–67 (November 1992).

Further, the absorption bands for both the B and M states can be changed to enable the use of different wavelength input and modulation fields as described herein. For example, substituting an azulene derivative of retinal for the naturally-occurring retinal chromophore results in a bR molecule that has an absorption band shifted into the infrared portion of the optical spectrum. See, e.g., Asato et al., J. Am. Chem. Soc., 112:7390–7399 (1990). A 13-trifluoromethyl-retinal derivative brings the modified bR into the range of diode laser wavelengths. See, e.g., Gardener et al., J. Am. Chem. Soc., 103:7642–7643 (1981). Using other retinal analogs, bR's absorption bands can be shifted to nearly any portion of the near-infrared/visible/near-ultraviolet spectrum. See, e.g., Oesterhelt et al., Quarterly Rev. Biophysics, 24:425–478 (1991).

For use in an optical processing system, bR is preferably dispersed into a polymer matrix and cast into a thin film that can be inserted into a device. Such a thin film can be prepared from the purple membrane of *Halobacterium halobium*, e.g., as follows.

The isolated membranes were first washed with deionized water and then passed through a 5 μm pore size filter to remove particulate matter. A stock solution of 40% (w/w) acrylamide was made with an acrylamide to N,N'-methylene-bis-acrylamide ratio of 20:1. A concentrated bR solution (3.5 ml) was then mixed with the acrylamide stock solution (0.5 ml). Two glass plates separated by three, 3 mm thick spacers were used to form a rectangular gel cassette. The gel solution was prepared by mixing a polymerization catalyst, ammonium persulfate (0.03% w/w), and an initiator, N,N,N',N'-tetramethylethylenediamine (1 μl/ml), with the bR/acrylamide solution. The gel solution was poured into the cassette immediately after preparation.

After polymerization, the cast gel was removed from the cassette and rinsed with deionized water. The gel was then soaked in a sodium borate buffer (pH 10, 10 mM) for 24 hours. The buffer-equilibrated gel was then covered with two gel-drying cellulose films and held firmly in a drying cell. The film was dried at room temperature for about 24 hours. The dried bR-polymer film was then held between two glass plates to prevent deformation.

The final film had an optical density of 2 absorbance units at 568 nm, 0.14 at 633 nm, and 0.45 at 458 nm. The final film preferably has an optical density of between 0.5 and 5 absorbance units at 570 nm. The preferred thickness of the film is between one millimeter and one micron. The main advantage of preparing the film using this method is that the M state lifetime can be varied by changing the pH of the soaking buffer solution.

The optical processing systems described herein exploit the dynamics of the B and M states, which are the two most stable states in the bR photocycle. For all practical purposes, the remaining short-lived intermediate states of the photocycle can be neglected, and the saturation dynamics of bR can then be analyzed using a simplified two level model. See also, Dovgalenko et al., Appl. Phys. Lett., 68:287–289 (1996). Thus, the population at the M and B states can be described by rate Equation 1:

$$\frac{dM}{dt} = \sigma_1 F B - \frac{M}{\tau} - \sigma_2 F M \quad (1)$$

where F is the photon density flux of the incident field, M and B are the molecular populations per unit volume in the M and B states, respectively, $\sigma_1$, $\sigma_2$ are the absorption cross-sections for the nonradiative transitions B to M and M to B, respectively, and τ is the relaxation time for the M to B transition. The steady state solution of Equation 1 yields the population per unit volume of the M and B states as Equation 2:

$$B = N \left[ \frac{1 + \sigma_2 F \tau}{1 + (\sigma_1 + \sigma_2) F \tau} \right] \quad (2)$$

with M=N−B, where N is the number of bR molecules per unit volume of the sample.

The intensity dependent nonlinear absorption is described by the Equations 3a and 3b:

$$\alpha = N \sigma_1 \left[ \frac{1 + 2 \tau_2 F \tau}{1 + (\sigma_1 + \sigma_2) F \tau} \right] = \alpha_0 - \frac{gI}{1 + \frac{I}{I_s}} \quad (3a)$$

$$\frac{dI}{dz} = -\alpha(I) I \quad (3b)$$

where $\alpha_0 = N \sigma_1$, $g = N_1(\sigma_1 - \sigma_2) \tau / h\nu$, and the saturation intensity level $I_s = h\nu/(\sigma_1 + \sigma_2) \tau$. For light of wavelengths close to or greater than 570 nm, $\sigma_1 >> \sigma_2$, and α(I) exhibits saturable absorption. The term $\alpha_0$ includes linear absorption as well as any loss due to scattering.

Independent of the slow thermal relaxation of the bR chromophore from the 13-cis M state configuration to the all-trans B state configuration, the transition can be stimulated using blue light in a time frame of several nanoseconds. For example, the source of blue light used in some of the devices described below had a wavelength of 458 nm. The net result of the presence of the blue light was to effectively increase the saturation intensity level of the bR film by several orders of magnitude at 410±50 nm. In summary, the photoinduced dichroism in the bR film depends on the saturation intensity level.

Optical Processing Systems

Optical processing, i.e., spatial filtering, in the optical processing system is accomplished by providing an optical input image having a single linear polarization, and then processing that input image to generate an output image that contains a range of linearly polarized light of varying orientations corresponding to the different spatial frequency components of the optical input image. This permits the use of an analyzer, e.g., a rotatable polarizer, after an inverse Fourier transformation, which blocks specific polarization components of the transformed image, which in turn spatially filters the image to produce the output image.

FIG. 1 shows a schematic of an optical Fourier processing system (see also, Joseph et al., Optics Letters, 21:1499–1501, 1996). Processing system 10 utilizes photoinduced dichroism in a photochromic material film 12, e.g., containing bacteriorhodopsin. This basic configuration can be adapted to include optics to process multiple input images. Generally, any optical Fourier processing arrangement will work. For example, a system can be based on concave mirrors instead of convex lenses. Radiation source 14' generates optical input beam 14 (only the outer edges of the beam are represented in the diagram) which passes through an object 16 to form the optical input image 16'. If optical input beam 14 was not already polarized, this image is polarized by polarizer 18, and passes through lens 20, which forms a Fourier transform of the optical input image 16' on the photochromic film 12. Lens 22 then forms the inverse Fourier transform to generate the processed image 16" at the output image plane 26, e.g., a CCD camera. The only alignment of these elements required is that the lenses focus the transformed images on the appropriate plane.

Actinic beam 28, generated by radiation source 28', illuminates the photochromic film 12 where it is or will be illuminated by the optical input image 16'. Actinic beam 28 is linearly polarized at a given angle, e.g., 45°, with respect to the image polarization introduced by polarizer 18 but can be adjusted to any angle between 10° and 80° with respect to the image polarization. In general, the actinic beam 28 must be arranged at an angle with respect to the polarizer 18 so that the optimum contrast and polarization rotation of the image is achieved. Both the actinic beam 28 and the optical input beam 14, which illuminates the object 16, can be, but need not be, derived from a single light source. For the actinic beam, the light source must induce a dichroism in the photochromic material that predominates over any induced birefringence. This dichroism produces a rotation of the plane of polarization of the input image beam passing through the dichroic parts of the film. This actinic beam-induced angular rotation of the optical input image beam and its dependence on probe beam intensity profile at the Fourier plane, as explained in further detail below, are the basic principles employed by the optical Fourier processing system.

The actinic beam can be coherent or incoherent radiation. Similarly, the input beam source can be derived from a coherent or an incoherent light source. One suitable light source when bacteriorhodopsin is used as the photochromic material is an Ar—Kr laser tuned to a wavelength of 570 nm. In general, the actinic beam and the input image beam must be at a wavelength that optimizes photoinduced dichroism in the photochromic material.

Initially with no actinic beam present, the polarizer 18 and the analyzer 24 are arranged so that their respective polarizing orientations are at right angles to each other. The input beam 14 illuminating the object 16 is adjusted to produce an intensity of greater than about 10 mW/cm$^2$ at the center of the Fourier transform of the object formed in the plane of the photochromic material film 12. The optimum intensities of the input beam and actinic beam depend on the particular bR film used, and will ordinarily vary from at least 0.1 mW/cm$^2$ to about 1000 mW/cm$^2$.

In a specific example, system 10 was designed with a bacteriorhodopsin (bR) film as the photochromic material film 12. The bR film was purchased from Wacker Chemical (U.S.A.) Inc. (Connecticut), and had a thickness of about 35 $\mu$m, and an optical density of 0.47. All the experiments were performed with an Ar—Kr laser (Coherent Innova 70 Spectrum, Coherent, California) tuned to a wavelength of 570 nm. The dichroism in the bR film was induced by an actinic beam 28 at the same wavelength of 570 nm. Both beams were derived from the same laser keeping the difference in their path lengths more than the coherence length of the laser to avoid interference effects between the two beams.

The plane of polarization of the actinic beam 28 was oriented at 45° with respect to the polarization of input beam 14, thereby improving the contrast and rotation obtained. The actinic beam induces dichroism in the bR film. The input beam, as it passes through the now dichroic bR film, undergoes a polarization rotation. The magnitude of rotation depends on the intensities of both of the actinic and input beams in an additive manner. This angular rotation was measured by rotating analyzer 24.

Figure 2:
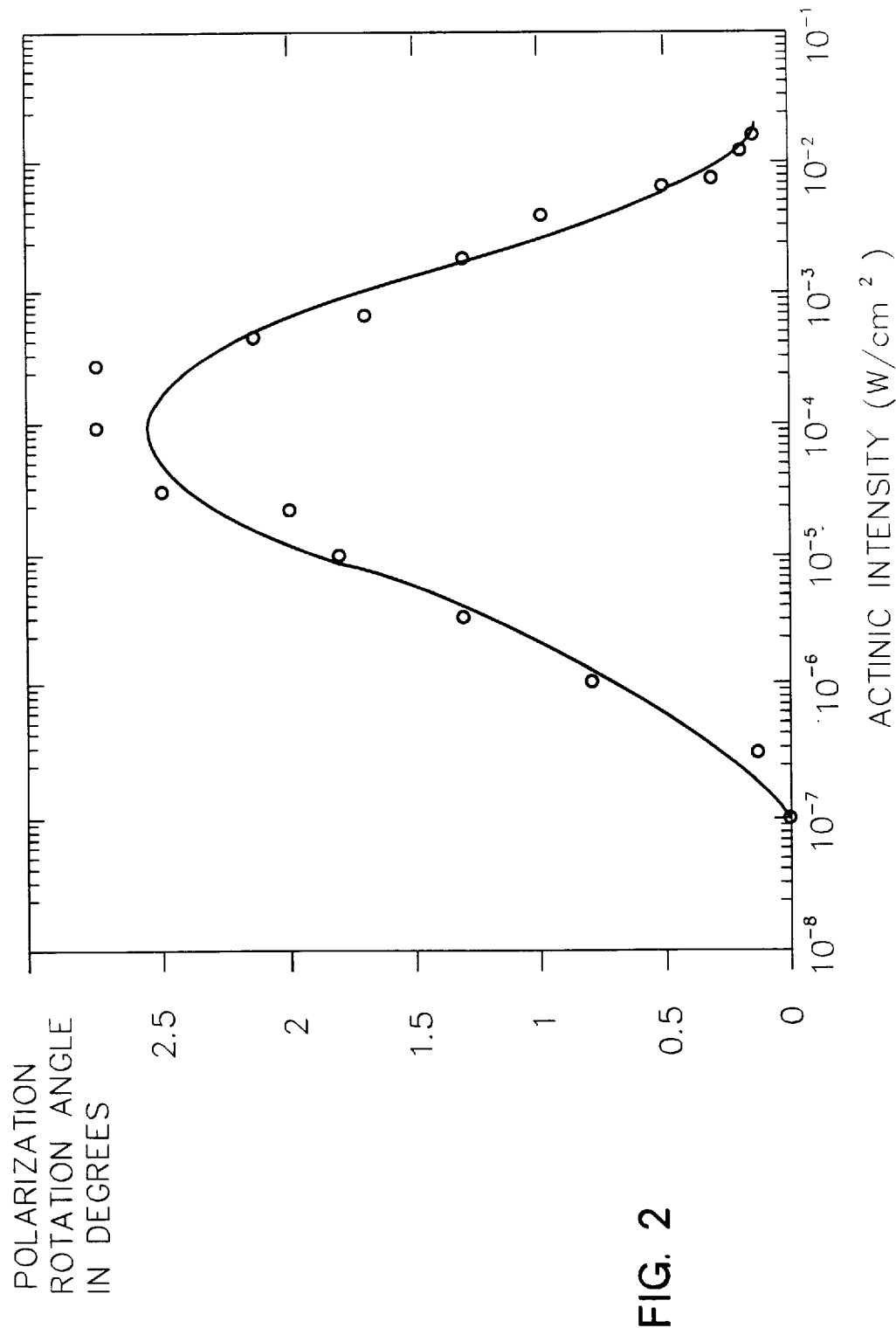
FIG. 2 is a graph showing the dependence of photoinduced polarization rotation angle on actinic beam intensity.

At first, the dependence of this induced angular rotation of input beam polarization was measured as a function of the intensity of the actinic light beam, using a weak input beam so that it would not contribute to the photoinduced dichroism. As shown in FIG. 2, the photoinduced angular rotation of the input beam polarization reached a maximum angular rotation for an optimum actinic beam intensity of about $10^{-4}$ W/cm$^2$, and it decreased with further increase in the actinic beam intensity. This measurement depends specifically on the characteristics of the particular film used.

Figure 3:
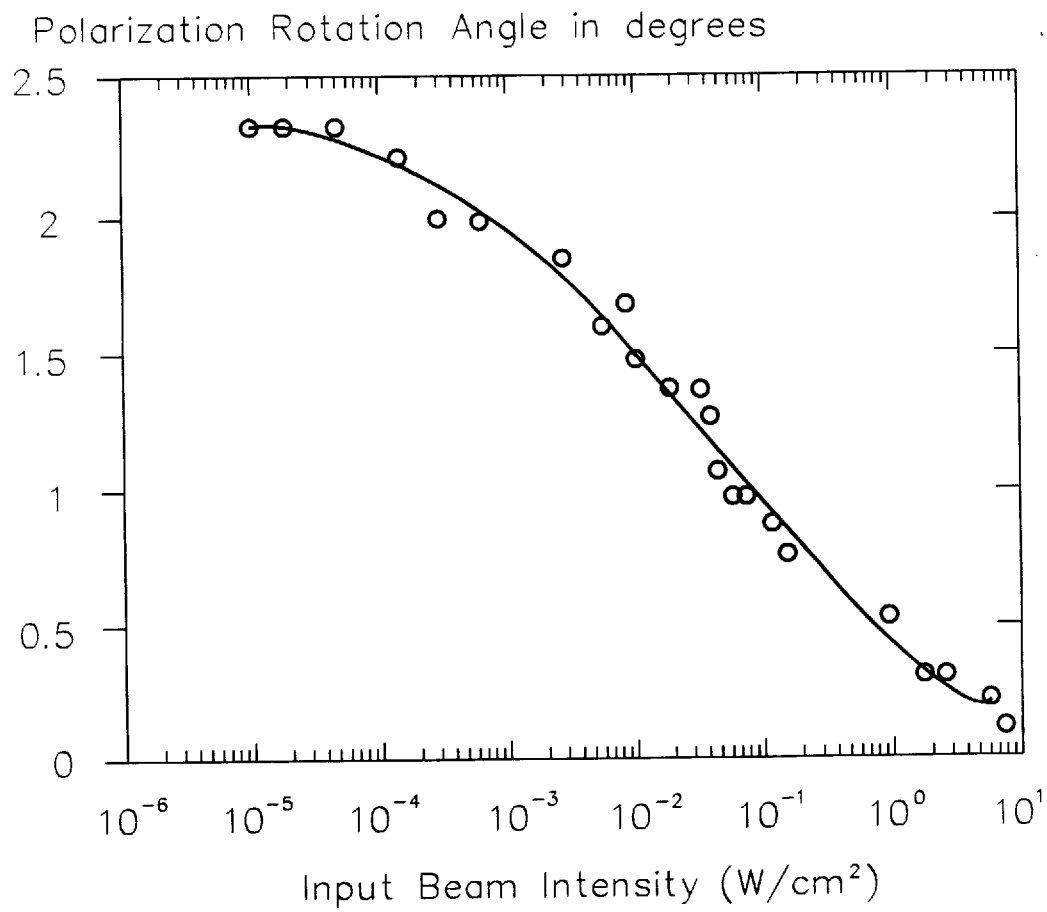
FIG. 3 is a graph showing the dependence of photoinduced polarization rotation angle on input beam intensity, with a constant actinic beam intensity of about 10 mW/cm$^2$.

Next, the actinic beam intensity was adjusted to about 10 mW/cm$^2$, where the angle of rotation, and hence the corresponding dichroism, is at a maximum, and the intensity of the input beam was gradually increased. FIG. 3 is a graph of the experimental data showing the degree of rotation of input beam polarization as a function of input beam intensity, under a constant actinic beam intensity of 10 mW/cm$^2$. In this experiment, the angle of polarization rotation decreased steadily from about 2.3° at $10^{-5}$ W/cm$^2$, to about 0.2° at 4.0 W/cm$^2$.

As shown in FIG. 3, increasing the input beam intensity decreases the degree of polarization rotation of the input beam, because high input beam intensities reduce the anisotropy of the bR film. With high intensities of about 10 W/cm$^2$ for the input beam, the angular rotation experienced by the input beam polarization was nearly zero. The result demonstrated in FIG. 3, i.e., that increasing the input beam intensity reduces the angle of rotation of the input beam passing through the bR film under the influence of the actinic beam, can be effectively used for optical Fourier processing.

In this experiment, the analyzer was mounted on a rotation stage with minimum detectable angular rotation of 0.1°. The system is very sensitive to changes in input beam intensity, thus a more accurate rotation stage could be used.

Applications

The optical processing system described herein can be used to process a wide variety of optical images, and can be used to perform an assortment of different functions.

Optical Input Images

The processing system can be used to process still images such as photos, slides, and negatives, i.e., any optical image that can be projected through a Fourier transforming lens or mirror. For example, the image can be formed of visible light and projected through a converging lens or reflected from a concave mirror.

The system is thus useful for enhancing X-ray, CAT scan, magnetic resonance, ultrasound, and other images generated by medical imaging techniques. The images can be acquired by any photographic technique, video or film. The system also can be used to process images obtained from satellite-based cameras. For example, the system can be used for edge enhancement of satellite images for target identification.

In addition, the system can be used to process moving images in real time. The real-time operation of the present optical processing system allows the enhancement of moving images, e.g., live or recorded videos or motion pictures, or physically moving flows of gas jets, water, or other liquids. As with still images, the present optical processing system can be used to enhance any moving image that can be projected through a Fourier transforming lens.

As another example, the processing system can be incorporated into computer vision devices to enhance the images "seen" by the device. Such devices can be used in robotic quality control systems, e.g., to identify normal and defective parts on an assembly line, in pattern recognition systems, and in fingerprint analysis systems.

Types of Processing

The present optical processing system provides simplified and improved performance compared to other systems because the same optical processing system can be used to perform low-, band-, and high-pass filtering, and notch filtering operations by simply adjusting the analyzer or by varying the intensities of the input image and/or actinic beams. In addition, the present system provides the versatility for diverse applications such as noise filtering, flow visualization, wavelet-like filtering, and beam shaping.

For low-pass filtering applications, the analyzer is adjusted to an angle that lets low frequency components through the polarizer and blocks the high frequency components. In high-pass filtering applications, the opposite is true; the analyzer is configured to let the high frequency components through while blocking the low frequency components.

Flow visualization can be achieved by using the high-pass configuration, where the high frequency components pass through the analyzer to show the flow image, which is typically composed of high frequency components.

A notch filter can be created by carefully arranging the analyzer to block intermediate frequency components. Beam shaping is achieved using a notch filter arrangement, where the spatial light intensity profile of the beam cross section varies, as shown, e.g., for a Gaussian beam in FIGS. 5A–5E.

Band-pass filtering can be achieved by allowing select frequency components to pass through the analyzer and blocking the rest of the components, e.g., by shaping the actinic beam as shown in FIGS. 5A–5E. Each beam shape will let through a different set of frequency components.

Wavelet filtering can be accomplished in a manner similar to band-pass filtering. The actinic beam, or a third beam at 570±50 nm or 410±50 nm, is shaped to let through a different set of frequency components. The third beam can be an unpolarized beam, which destroys the anisotropy in certain regions of the bR film. The purpose of this third beam is to destroy the induced dichroism in selected regions of the Fourier plane so that no polarization rotation takes place in those regions and only light incident in the regions unaffected by the third beam is rotated, thus rotating only a narrow band of frequencies determined by the specific wavelet used.

For example, a circular wavelet is shown in FIGS. 5A–5E. If the third beam has the shape of FIG. 5B, only the spatial frequencies corresponding to the dark regions would be seen at the CCD plane, resulting in a wavelet transformed processed image. Both the size and shape of that beam can be varied, thus making it an effective wavelet filter. Wavelet-like filtering, or complementary wavelet filtering can be achieved by rotating the analyzer to block different sets of frequency components.

EXAMPLES

The following examples of spatial filtering were carried out using the optical processing system described above.

1. Edge Enhancement

Figure 4A:
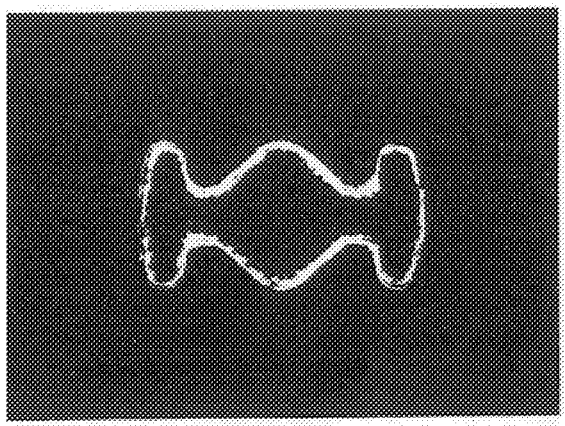
FIG. 4A is a processed image of a razor blade demonstrating edge enhancement of the inner portion of the razor blade.

FIG. 4A shows the result of high frequency spatial filtering, so-called "edge enhancement," when the input image is the inner opening of a razor blade. On illuminating the film 12 with actinic beam 28 having an intensity of about 10 mW/cm$^2$, only the edges of the opening in the razor blade appear in the processed output image 16" at the output image plane 26, e.g., CCD, giving the desired edge enhancement.

This self-adaptive edge enhancement can be explained as follows. The Fourier transform of an object image formed on the photochromic material film has an intensity distribution with high intensities for low frequency components (such as the main area of the opening in the razor blade) and low intensities for high frequency components (such as the edges of the opening in the razor blade). The graph in FIG. 3 shows that at an optimum actinic beam intensity, the effect of increasing the input beam intensity is to decrease its degree of polarization rotation due to photoinduced dichroism. Therefore, high frequency components at the bR plane experience a higher degree of polarization rotation than the zero and low frequency components. Hence, if the input image has a single linear polarization, after its passage through the bR film under actinic light illumination, it has a range of polarizations of different orientations that depends on the intensity (and, thus, the frequency) of the components.

Fourier processing is accomplished through the analyzer, which blocks specific polarization components, which in turn blocks the corresponding spatial frequencies. When the analyzer is arranged to polarize at right angles to the input beam polarization, zero and low frequency components which experience almost no polarization rotation due to their high intensities are blocked by the analyzer. However, the high frequency components corresponding to the edges of the razor blade opening experience a polarization rotation and at least in part pass through the analyzer to appear at the CCD camera to give edge enhancement.

Rotation of the analyzer can work as a variable spatial filter for Fourier processing. Thus, the edge enhancement becomes a more broadly applicable notch filter that selectively blocks a specific set of frequencies.

2. Noise Filtering

Figure 4B:
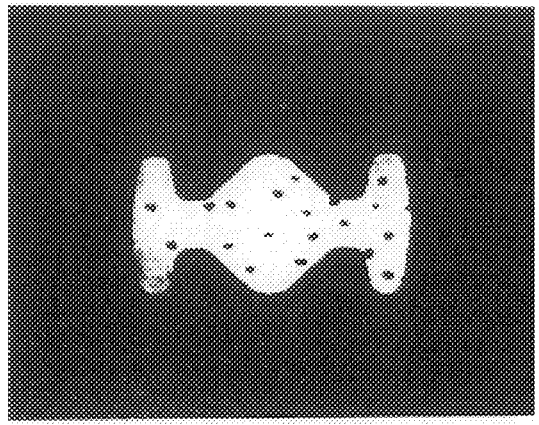
FIG. 4B is an input image of the razor blade of FIG. 4A showing black dots as "noise" in the original input image.

Another experiment on spatial filtering was done by adding optical "noise" (which appears in the image as low intensity, high frequency components) to the input image and then performing low frequency spatial filtering to smooth the image and remove the noise. In this case, a glass plate with small black dots was placed adjacent the razor blade of FIG. 4A. FIG. 4B shows the input image of the razor blade opening and the black dot noise. In this example, the bR film was illuminated with actinic light at 570 nm, and the analyzer was rotated by about 3° so that the analyzer was crossed to (and thus blocked) the polarization rotated high frequency components of the image.

Figure 4C:
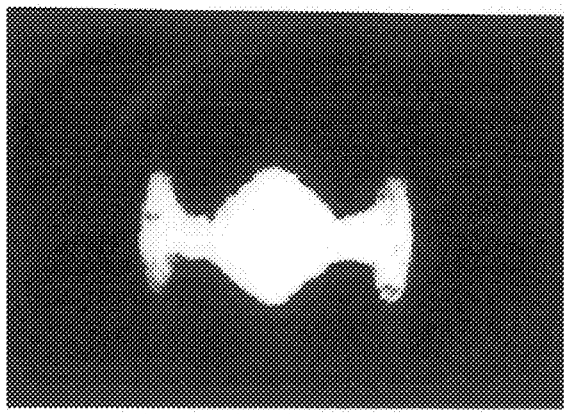
FIG. 4C is a processed image of the razor blade and noise of FIG. 4B, after processing to remove the noise.
Figure 4D:
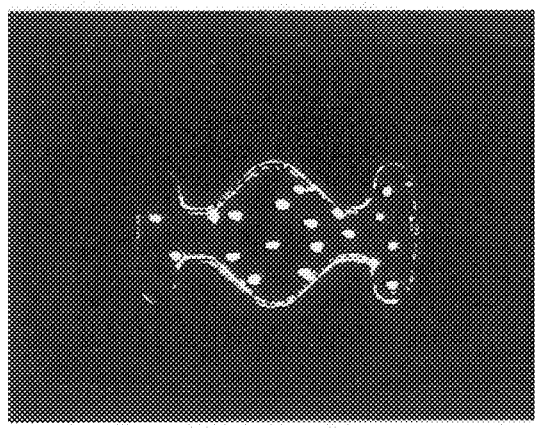
FIG. 4D is a processed image of the razor blade and noise of FIG. 4B, with edge and noise enhancement.

As shown in FIG. 4C, when the high frequency components were blocked, only the high intensity, low frequency components of the input image appeared in the processed image at the CCD camera, and the processed image was thus smoothed and free of noise. However, as shown in FIG. 4D, when the analyzer was rotated back to the position in which it blocks the high intensity, low frequency components as in the edge enhancement example above, the processed output image showed an enhancement of both noise and the edges.

3. Beam Shaping

In another example, the spatial filtering system was used to shape an input image beam with a Gaussian intensity profile. The Gaussian beam output from a laser was passed through the polarizer 18, the photochromic material (bR) film 12, and the analyzer 24, to be imaged by the CCD at image plane 26. The actinic beam 28 uniformly illuminated the film 12 with an intensity of about 10 mW/cm$^2$.

Since the input beam has a Gaussian intensity variation across the beam, the anisotropy, and hence the angle of rotation experienced by the input beam, is different at different locations across the beam. For example, the center of the beam has the maximum intensity, and thus experiences the least rotation, and the angle of rotation increases from the center to the outer edges of the beam. Thus, the processing system can be used to shape the input beam image. The images of the input beam captured at the CCD with gradual rotation of the analyzer are shown in FIGS. 5B to 5E.

Figure 5A:
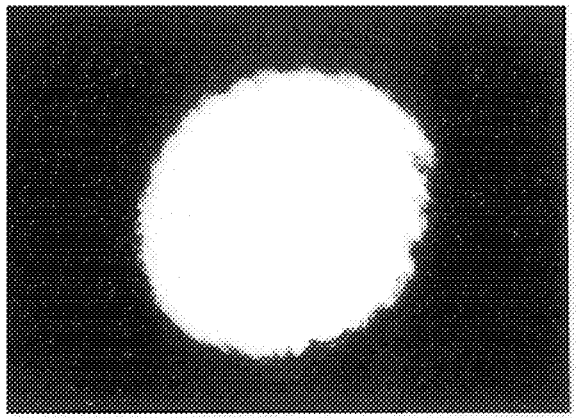
FIG. 5A is an input image of a Gaussian light input beam.
Figure 5B:
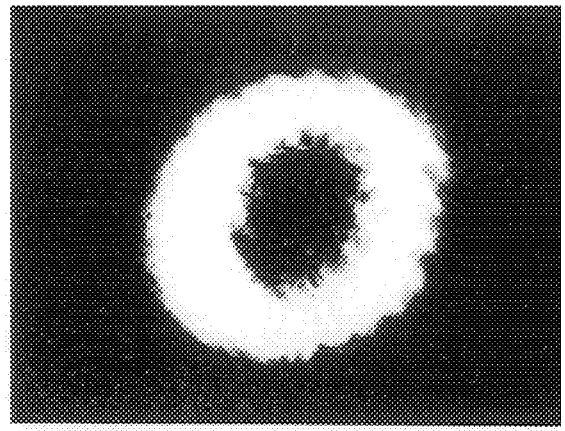
FIGS. 5B to 5E are a series of processed images of the Gaussian light input beam of FIG. 5A.
Figure 5C:
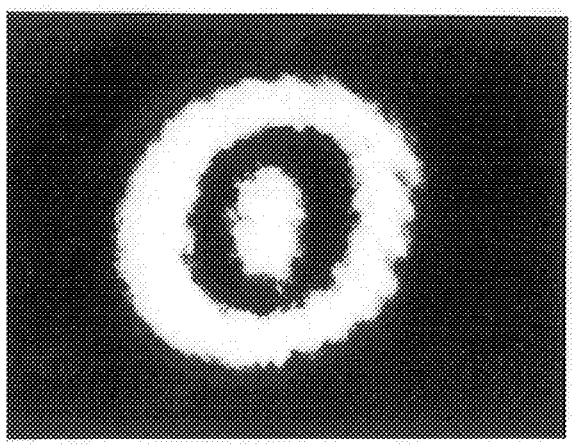
Figure 5D:
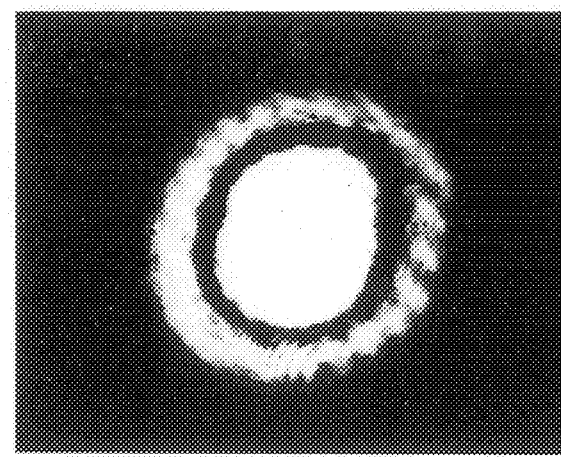
Figure 5E:
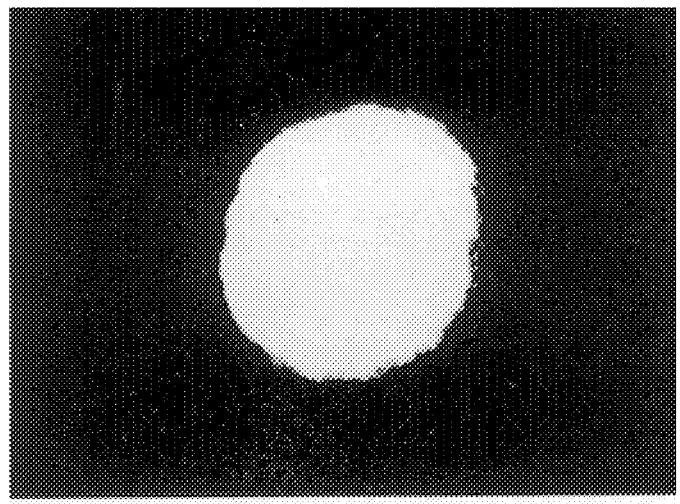

With the analyzer crossed to the polarizing filter (angle of rotation is 0°), the center of the input beam is blocked (FIG. 5B) and rotating the analyzer blocks different circular "rings" within the beam (FIGS. 5C, angle of rotation is 0.50; and 5D, angle of rotation is 1.5°). Hence, the shape of the beam depends on the angle of the analyzer. The incident Gaussian beam transforms to a donut profile (FIG. 5B) and then back to a Gaussian beam with a smaller diameter when the outer edges of the beam are blocked (FIG. 5E). The input (image) beam was less intense than the actinic light. The experimental set-up was similar to that used in the above-mentioned examples, where the image was now the Gaussian beam rather than the razor image. The beam images were obtained with a CCD camera.

4. Visualization of Moving Air Flow

Figure 6:
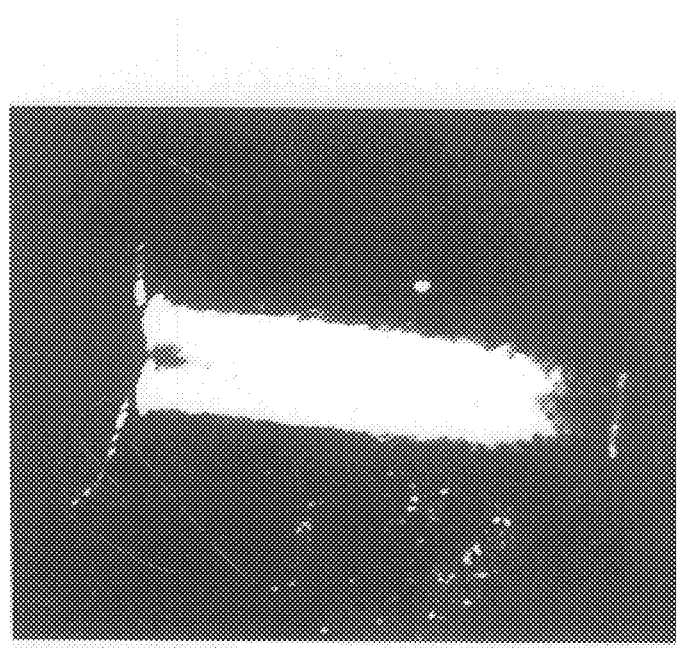
FIG. 6 is a processed image of an air flow.

FIG. 6 shows an image of a moving air flow from an air-jet nozzle. The experimental set-up was similar to that used in the above-mentioned examples, and the image was generated by shining the input beam through a moving air flow, giving rise to the detection of high frequencies which reveal the details of phase disturbances and enable flow visualization. The output from an Ar—Kr laser at a wavelength of about 570 nm was used to produce both the actinic and input image beams. An expanded parallel beam from a beam expander illuminated the test region, in which the air-jet was fired. The illuminated air jet was Fourier transformed and focused on the bR film using a convex lens having a focal length 40 cm. The polarizer was oriented with polarization parallel to the polarization of the input image beam to highly polarize the beam reaching the bR film.

A second convex lens performed the inverse Fourier transformation to provide an image of the air jet at the CCD camera. The analyzer was aligned crossed to the polarizer. The image obtained at the CCD camera was therefore fully dark at this analyzer position in the absence of the actinic beam. The expanded actinic beam uniformly illuminated the bR film with an intensity of 10 mW/cm$^2$. The actinic beam polarization was set at 45° to the probe beam polarization with a polarization rotator.

In the presence of the actinic beam, the phase disturbances at the test region become visible at the CCD camera. FIG. 6 is an image obtained with the CCD camera showing the visualization of the high frequencies of the image of the air-jet. Different regions of the air flow pattern can be imaged by changing the angle of the analyzer, thereby changing the frequency components being observed.

5. Logic Manipulations of Input Images

Figure 7:
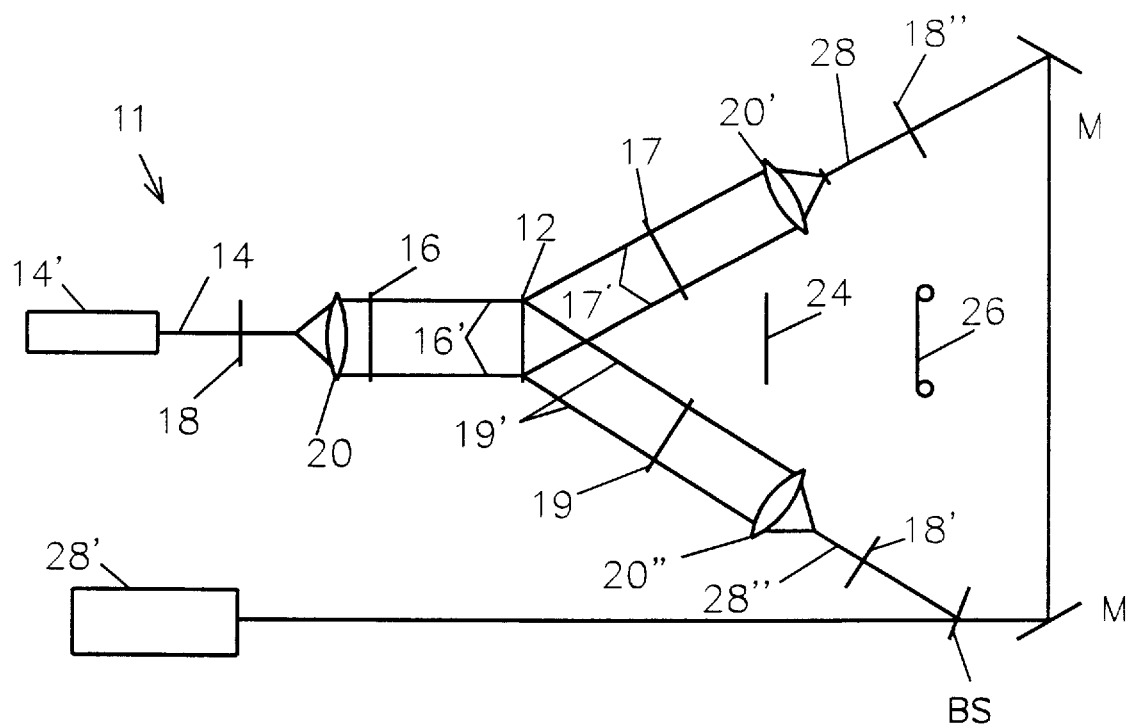
FIG. 7 is a schematic drawing of an optical processing system for executing logic functions on two or three input images.

An optical system for performing two-dimensional logic operations including OR, NOR, XOR, and AND, as well as other logical operations, was set up modifying the configuration of the basic bR film, lenses, and polarizers in the system described above to allow the use of additional inputs beams. A two input beam system that contains three spatial light modulators (SLMs)(e.g., from Meadowlark Optics, Inc., Longmont, Colo.) as the electronic-optic interface was set up as shown in FIG. 7. The two-dimensional inputs of the logic operations are presented to the bR film through the SLMs in accordance with the experiment described below.

FIG. 7 shows a schematic of an optical processing system 11 that has three beams. Radiation source 28' generates a first actinic beam 28 and a second actinic beam 28". Radiation source 14' generates input beam 14. The system can include two input images or three input images generated when input beam 14, actinic beam 28, and actinic beam 28"pass through object 16, object 17, and object 19, to form optical image 16', optical image 17', and optical image 19', respectively. Two or three of the images can be present, in different configurations, to achieve logic output.

In the two image logic system, He—Ne laser output at 632.8 nm was used to generate the actinic beams 28 and 28", and a green He—Ne laser output at 543 nm was used to generate input beam 14. Lenses 20, 20', and 20" are present in the beam paths to broaden the beams to carry the images and illuminate the bR film 12.

The bR film 12 is located between polarizer 18 and analyzer 24 which are crossed to get zero output at the image output plane 26, e.g., a CCD camera, when the actinic beams 28 and 28" are not illuminating bR film 12. Analyzer 24 is a rotating polarizer. The input beam 14 and actinic beams 28 and 28" can be made orthogonally polarized (i.e., at 90°) by rotating polarizer 18". In other orientations, the two actinic beams can be made parallel polarized (0°) or, the plane of polarization of the actinic beams can be set at 45° to the plane of polarization of the input beam.

As actinic beam 28 passes through image 17, rotating the plane of polarization of the probe beam in the clockwise direction and actinic beam 28" passing through image 19 rotates the plane of polarization of the input image beam in the counter-clockwise direction. Rotation of the analyzer 24, along with the polarization rotation of actinic beam 28 at polarizer 18" can result in many logic operations at the output image plane 26.

Figure 8A:
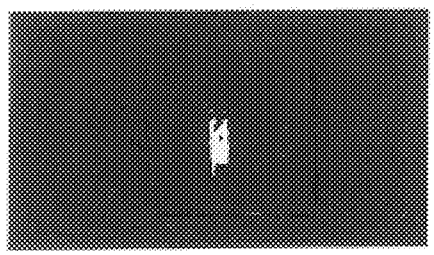
FIGS. 8A to 8G are a series of images demonstrating the ability of the optical processing system of FIG. 7 to manipulate two input images using logic functions.
Figure 8B:
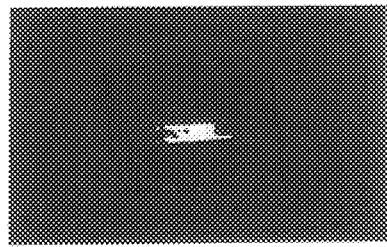

In one the configuration, the two dimensional inputs for the logic operations were presented at the object 19 and object 16 or object 17. For simplicity a vertical slit having the image shown in FIG. 8A (pattern A) was located at object 19. A horizontal slit having the image shown in FIG. 8B (pattern B) was located at object 16 or object 17 in accordance with the operations as given below.

Figure 8C:
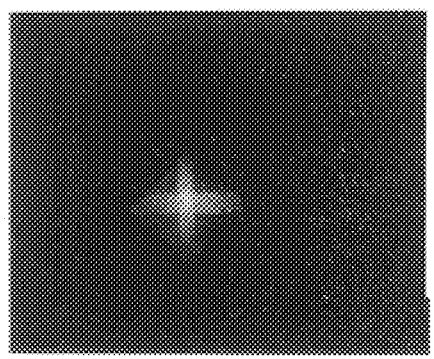

The OR operation (A OR B) was carried out by maintaining both actinic beams with the same polarization angle with no pattern at object 16, and crossing polarizer 18 and analyzer 24. The output image is shown in FIG. 8C. The truth table for the OR operation is:

| A | B | Out |
|---|---|-----|
| 1 | 1 | 1 |
| 1 | 0 | 1 |
| 0 | 1 | 1 |
| 0 | 0 | 0 |

The OR operation was equivalent to addition of the images.

Figure 8D:
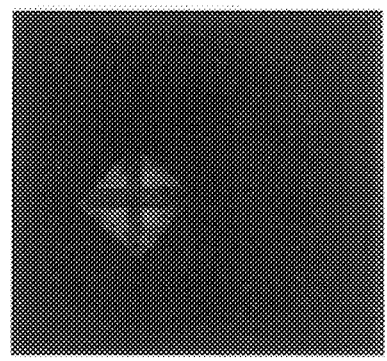

The NOR operation (A NOR B) was carried out by maintaining both actinic beams with the same polarization angle with no pattern at object 16, as in the OR operation, and rotating the analyzer by 1° clockwise to block the polarization rotated input beam. The output image is shown in FIG. 8D. The truth table for the NOR operation is:

| A | B | Out |
|---|---|-----|
| 1 | 1 | 0 |
| 1 | 0 | 0 |
| 0 | 1 | 0 |
| 0 | 0 | 1 |

Figure 8E:
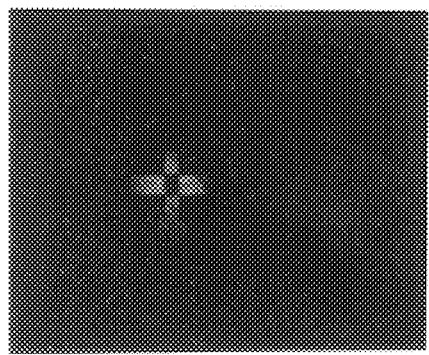

The XOR operation (A XOR B) was carried out by rotating the polarization of the actinic beam through object 17 to be orthogonal to the input beam with no pattern at object 16, and crossing polarizer 18 and analyzer 24. The output image is shown in FIG. 8E. The truth table for the XOR operation is:

| A | B | Out |
|---|---|-----|
| 1 | 1 | 0 |
| 1 | 0 | 1 |
| 0 | 1 | 1 |
| 0 | 0 | 0 |

The XOR operation was equivalent to subtraction of the images.

Figure 8F:
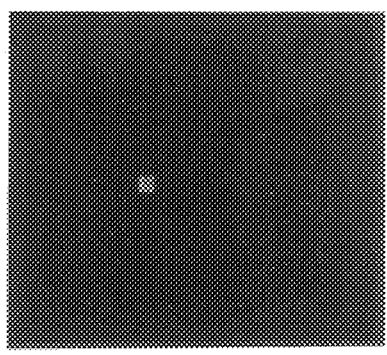

The AND operation (A AND B) was carried out by blocking actinic beam 28, placing pattern B at object 16 and pattern A at object 19, and crossing polarizer 18 and analyzer 24. The output image is shown in FIG. 8F. The truth table for the AND operation is:

| A | B | Out |
|---|---|-----|
| 1 | 1 | 1 |
| 1 | 0 | 0 |
| 0 | 1 | 0 |
| 0 | 0 | 0 |

Figure 8G:
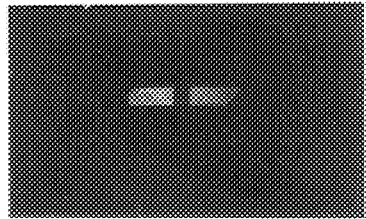

The (not A) AND B operation was carried out by blocking the actinic beam passing through object 17, placing pattern B at object 16 and pattern A at object 19, and rotating the analyzer 24 by 1° clockwise to block the polarization rotated input beam. The output image is shown in FIG. 8G. The truth table for the (not A) AND B operation is:

| A | B | Out |
|---|---|-----|
| 1 | 1 | 0 |
| 1 | 0 | 0 |
| 0 | 1 | 1 |
| 0 | 0 | 0 |

Figures 9A, 9B:
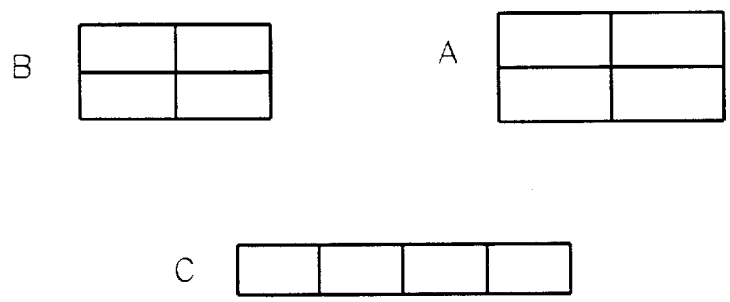
FIG. 9A is a schematic drawing of three input patterns.
FIG. 9B is a schematic drawing showing the overlap of the three patterns of FIG. 9A in a photochromic material film, and their respective polarizations.

Three input logic operations can also be carried out using the configuration of FIG. 7. In this embodiment, images are placed at object 16, object 17, and object 19, thus providing three input images. The rectangular input images A, B and C are shown in FIG. 9A. In this configuration, image A is located at object 16, image B is located at object 17, and image C is located at object 19. Images A, B, and C overlap in the bR film as shown in FIG. 9B. Input images A, B and C were overlapped in the bR film so that they overlapped to give the composite image shown in FIG. 9B, where none of the images overlap in the upper left quadrant of the composite image (not A and not B and not C), A and B overlap in column 3, A overlaps C in row 2, columns 3 and 4, B overlaps C in row 2, columns 2 and 3, and all three images overlap in row 2, column 3 (A and B and C).

Figure 9C:
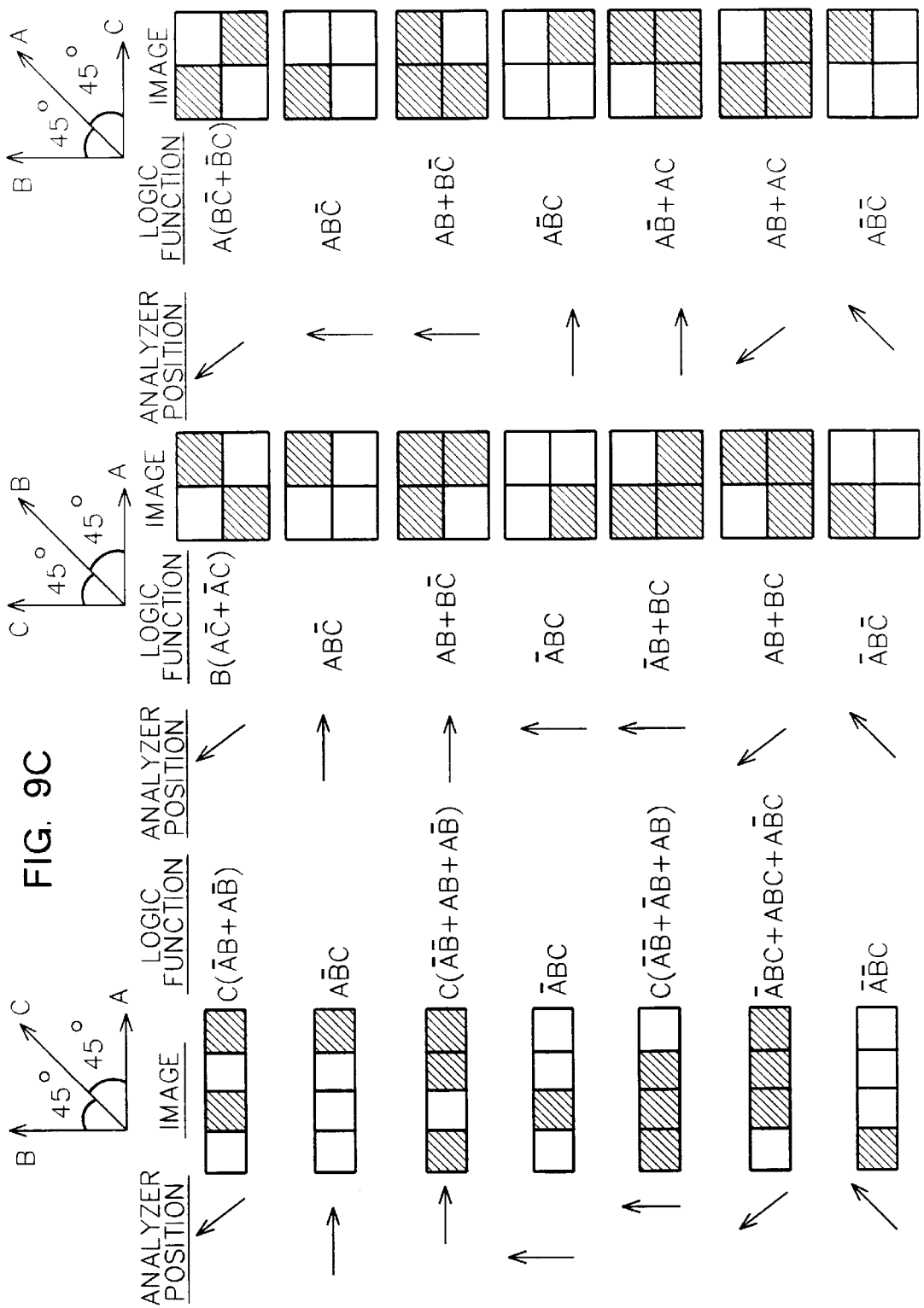
FIG. 9C is a schematic drawing of the logic functions that are obtained using the system of FIG. 7 with the three input images of FIG. 9A.

The three beams were polarized so that the two actinic beams were orthogonal (i.e., 90° to each other) and the input beam was polarized at 45° to the actinic beams. FIG. 9C shows three sets of logic processed data based on the composite image where the polarizations of A, B and C are represented as vectors. Different logic sets were obtained by changing the polarization orientation of the three input images as depicted in FIG. 9C. In each case, two images were polarized at 90° to each other and the third was polarized at 45° to the other two images. The analyzer polarization was varied to give different images that correspond to the image logic functions as indicated. This arrangement was equivalent to a logic gate with three inputs and one output. In general, different images and logic functions were obtained as the analyzer polarization is rotated by 45°. In situations in FIG. 9C where the analyzer polarization vector appears to be the same, the analyzer polarization was varied by a few degrees (i.e., between 1° and 3°) to obtain a logic function with a different result.

Other Embodiments

An efficient Fourier processing system is essential for pattern recognition, finger print detection, machine vision, optical computing, as well as a variety of other applications. The system based on bR films described here is efficient due to the parallel and real-time nature of the optical Fourier processing which is faster than electronic processing. The actual image is processed directly rather than a digitized version of the image used in current systems.

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

What is claimed is:

1. An optical processing system comprising:
   a film comprising a photochromic material;
   a first radiation source to generate an input beam, wherein the input beam carries an input image;
   a polarizer arranged in the path of the input beam to generate a polarized input beam;
   a first optical Fourier transformer arranged to focus the polarized input beam onto the photochromic material film;
   a second radiation source to generate a polarized actinic beam configured to illuminate the photochromic material film, wherein the actinic beam is set at a wavelength and intensity to induce in the photochromic material anisotropy that varies as a function of the intensity of total illumination on the photochromic material, such that the film transmits a variably polarized image beam including a plurality of polarization components;
   a second optical Fourier transformer arranged to provide an inverse Fourier transform of the variably polarized image beam from the photochromic material film;
   a polarizing analyzer arranged in the path of the variably polarized image beam and configured to selectively block a specific set of polarization components to generate an output image beam; and
   a radiation detector arranged to detect the output image beam.

2. An optical processing system of claim 1, wherein the first and second optical Fourier transformers are lenses.

3. An optical processing system of claim 1, wherein the input beam or the actinic beam varies in real time.

4. An optical processing system of claim 1, wherein the photochromic material is selected from a group consisting of an organic photochromic fulgide, cytochrome C, an azo dye, a carbazole compound a phycobiliprotein, a fluorescent dye, a rhodopsin, bacteriorhodopsin, and an analog of any of said materials.

5. The system of claim 4, wherein the photochromic material is bacteriorhodopsin or a bacteriorhodopsin analog.

6. The system of claim 5, wherein the actinic beam is set at a wavelength of about 570 nm ±100 nm.

7. The system of claim 5, wherein the input beam is set at a wavelength of 300 to 800 nm.

8. A system of claim 1, wherein the input beam and the actinic beam are generated by a laser.

9. A system of claim 1, wherein the input beam and the actinic beam are generated by an incoherent white light source.

10. A system of claim 1, wherein the input beam comprises a fixed image.

11. A system of claim 1, wherein the input beam comprises a moving image.

12. A system of claim 1, wherein the actinic beam is set at an intensity of between 0.01 k and 100 mW/cm$^2$.

13. A system of claim 1, wherein the actinic beam is set at an intensity of between 2 and 18 mW/cm$^2$.

14. A system of claim 1, wherein the input beam is set at an intensity of between 0.0001 and 10 mW/cm$^2$.

15. A system of claim 1, wherein the input beam is set at an intensity of between 0.01 and 1 mW/cm$^2$.

16. A system of claim 1, wherein the input image is generated by a medical imaging technique.

17. A system of claim 16, wherein the input image is generated by an X-ray, magnetic resonance, computerized axial tomography, or ultrasound imaging technique.

18. A system of claim 1, wherein the input image is generated by a satellite camera.

19. A system of claim 1, wherein the analyzer is configured to selectively block high intensity, low frequency components of the input image.

20. A system of claim 19, wherein the system provides edge enhancement of the input image.

21. A system of claim 1, wherein the analyzer is configured to selectively block low intensity, high frequency components of the input image.

22. A system of claim 21, wherein the system provides noise filtering of the input image.

23. A system of claim 1, wherein the actinic beam is shaped to transmit a particular set of polarization components through the analyzer.

24. A system of claim 1, further comprising a third radiation source to generate a third beam, wherein the third beam illuminates the photochromic material film.

25. A system of claim 24, wherein the third beam is shaped to transmit a particular set of polarization components through the analyzer.

26. A system of claim 25, wherein the third beam is set at a wavelength of between 300 and 800 nm.

27. A system of claim 25, wherein the third beam is set at a wavelength of between 360 and 460 nm.

28. A system of claim 1, wherein the actinic beam is set at an intensity to induce maximum anisotropy in the photochromic material.

29. An optical processing system comprising:
    a film comprising a photochromic material;
    a first radiation source to generate a polarized input beam, wherein the polarized input beam is projected onto the photochromic material film;
    a second radiation source to generate a first polarized actinic beam configured to illuminate the photochromic material film;
    a third radiation source to generate a second polarized actinic beam configured to illuminate the photochromic material film, wherein the first and second actinic beams are independently set at wavelengths and intensities to induce in the photochromic material anisotropy that varies as a function of the intensity of total illumination on the photochromic material, such that the film transmits a variably polarized image beam including a plurality of polarization components;
    a polarizing analyzer arranged in the path of the variably polarized image beam and configured to selectively block a specific set of polarization components to generate an output image beam; and
    a radiation detector arranged to detect the output image beam.

30. A system of claim 29, wherein the input beam carries a first input image and the first actinic beam carries a second input image.

31. A system of claim 29, wherein the first actinic beam carries a first image and the second actinic beam carries a second image.

32. A system of claim 29, wherein the input beam carries a first input image, the first actinic beam carries a second input image, and the second actinic beam carries a third image.

33. A system of claim 29, wherein the photochromic material is bacteriorhodopsin or a bacteriorhodopsin analog.

34. A system of claim 29, wherein the analyzer is configured to selectively block high intensity, low frequency components of the input image.

35. A system of claim 29, wherein the analyzer is configured to selectively block low intensity, high frequency components of the input image.

36. A method of spatial filtering of optical image data, the method comprising:
    irradiating a film comprising a photochromic material with an input beam, wherein the input beam carries an input image;
    polarizing the input beam to generate a polarized input beam;
    focusing the polarized input beam onto the photochromic film by Fourier transformation;
    illuminating the photochromic material film with a polarized actinic beam, wherein the actinic beam is set at a wavelength and intensity to induce in the photochromic material anisotropy that varies as a function of the intensity of total illumination on the photochromic material, such that the film transmits a variably polarized image beam including a plurality of polarization components;
    retrieving the variably polarized image beam from the photochromic material film by an inverse Fourier transform;
    generating an output image beam by arranging a polarizing analyzer in the path of the variably polarized image beam to selectively block a specific set of polarization components; and
    detecting the output image with a radiation detector.

37. A method of performing wavelet filtering of optical image data, the method comprising:
    irradiating a film comprising a photochromic material with an input beam, wherein the input beam carries an input image;
    polarizing the input beam to generate a polarized input beam;
    focusing the polarized input beam onto the photochromic film by Fourier transformation;
    illuminating the photochromic material film with a polarized actinic beam, wherein the actinic beam is set at a wavelength and intensity to induce in the photochromic material anisotropy that varies as a function of the intensity of total illumination on the photochromic material, such that the film transmits a variably polarized image beam including a plurality of polarization components;
    illuminating the photochromic material film with a third beam which is shaped to transmit a particular set of polarization components through the analyzer;
    retrieving the variably polarized image beam from the photochromic material film by an inverse Fourier transform;
    generating an output image beam by arranging a polarizing analyzer in the path of the variably polarized image beam to selectively block a specific set of polarization components; and
    detecting the output image with a radiation detector.

38. A method of performing logic manipulations of optical input data, the method comprising:
    irradiating a film comprising a photochromic material with a polarized input beam;
    illuminating the photochromic material film with a first polarized actinic beam configured to illuminate the photochromic material film;
    illuminating the photochromic material film with a second polarized actinic beam configured to illuminate the photochromic material film, wherein the first and second actinic beams are independently set at wavelengths and intensities to induce in the photochromic material anisotropy that varies as a function of the intensity of total illumination on the photochromic material, such that the film transmits a variably polarized image beam including a plurality of polarization components;

generating an output image beam by arranging a polarizing analyzer in the path of the variably polarized image beam to selectively block a specific set of polarization components; and detecting the output image with a radiation detector.

* * * * *